United States Patent
Tung (10) Patent No.: US 7,542,925 B2
(45) Date of Patent: Jun. 2, 2009

(54) METHOD AND SYSTEM OF MARKETING AND MASS PRODUCING CUSTOMIZED DOMESTIC FURNITURE

(75) Inventor: Paul Tung, City of Industry, CA (US)

(73) Assignee: Richfield Inc., City of Industry, CA (US)

( * ) Notice: Subject to any disclaimer, the term of this patent is extended or adjusted under 35 U.S.C. 154(b) by 784 days.

(21) Appl. No.: 11/147,798

(22) Filed: Jun. 7, 2005

(65) Prior Publication Data

US 2006/0277119 A1    Dec. 7, 2006

(51) Int. Cl.
G06Q 30/00    (2006.01)
G06F 17/00    (2006.01)

(52) U.S. Cl. .......................... 705/26; 705/27
(58) Field of Classification Search .................. 705/26, 705/27

See application file for complete search history.

(56) References Cited

U.S. PATENT DOCUMENTS

| | | | | |
|---|---|---|---|---|
| 5,111,392 | A * | 5/1992 | Malin | 705/29 |
| 6,002,855 | A * | 12/1999 | Ladner et al. | 703/1 |
| 6,052,669 | A * | 4/2000 | Smith et al. | 705/26 |
| 6,269,343 | B1 * | 7/2001 | Pallakoff | 705/26 |
| 6,568,058 | B1 * | 5/2003 | Wieland et al. | 29/91.1 |
| 6,727,925 | B1 * | 4/2004 | Bourdelais | 715/852 |
| 7,246,044 | B2 * | 7/2007 | Imamura et al. | 703/1 |
| 2002/0093538 | A1 * | 7/2002 | Carlin | 345/778 |
| 2004/0236547 | A1 * | 11/2004 | Rappaport et al. | 703/2 |

FOREIGN PATENT DOCUMENTS

JP    2000048081 A * 2/2000
JP    2004062628 A * 2/2004

OTHER PUBLICATIONS

Perl, L., "Computers Speed up Buying Office Furniture," Crain's Detroit Business, vol. 13, No. 22, p. 12, Jun. 2, 1997.*
Cox, W.M., et al., "The Right Stuff: America's Move to Mass Customization," Economic Review (Federal REserve Bank of Dallas), pp. 3-26, 1998.*
Kunkel, K., "RTA Online: Selection, Convenience Key," HFN The Weekly Newspaper for the Home Furnishing Network, p. 33, Jan. 10, 2000.*

(Continued)

*Primary Examiner*—Nicholas D Rosen
(74) *Attorney, Agent, or Firm*—Raymond Y. Chan; David and Raymond Patent Firm (57) ABSTRACT

A system of marketing and mass producing customized domestic furniture includes a graphic customizing center and a service center. The graphic customizing center has an electronic database which contains a plurality of domestic floor plans and a plurality of furniture kits, wherein each of the domestic floor plans, which is simulated from a domestic environment to imitate the domestic furniture therein, has a plurality of customized areas preset on the domestic furniture to be customized for generating a plurality of custom made virtual domestic environments. The service center itemizes the furniture kits selected from the virtual domestic environments to mass-order the furniture kits for reducing a cost of the furniture kit in quantity manner.

17 Claims, 7 Drawing Sheets

OTHER PUBLICATIONS

Zaret, E., "The Macworld Web Shopper's Companion," Macworld, vol. 17, No. 1, p. 88, Jan. 2000.*

Kooser, A., "The Mod Squad," Entrepreneur, vol. 29, No. 5, p. 51, May 2001.*

Anon., "Camden Announces Nationwide 'Living Excellence' Campaign," PR Newswire, May 17, 2002.*

Anon., "From Clicks to Bricks: Online Furniture Brand Design Within Reach Rolls out Studio Prototypes in California," Display & Design Ideas, vol. 14, No. 10, p. 16, Oct. 2002.*

* cited by examiner

METHOD AND SYSTEM OF MARKETING AND MASS PRODUCING CUSTOMIZED DOMESTIC FURNITURE

BACKGROUND OF THE PRESENT INVENTION

1. Field of Invention

The present invention relates to domestic furniture, and more particularly to a customized domestic furniture system and a method thereof which enable a user to preview a virtual domestic design combined by an electronic floor plan and a selected furniture kit.

2. Description of Related Arts

During a typical furniture selection process, the customers usually need to preview a combination of different kinds of furniture to assess whether a particular combination of different furniture well fit to their home environment.

Conventionally, there exist two methods of doing that. First, retailers of furniture may provide the relevant customers with a stack of catalogues showing different combinations of different furniture or different appearance of a particular piece of furniture (e.g. different colors for a piece of domestic furniture). The customers may gain a general idea of what the particular piece of furniture looks like in the particular environment shown in the catalogue, and 'imagine' the overall effect that piece of furniture has if it is placed in their homes.

The problem with this conventional practice is that the environment demonstrated in the catalogue simply does not match with the customers' domestic environment. As a result, the overall effect of a particular combination of furniture may not duplicate in the customer's home in that each combination of furniture would have different aesthetic appeal in different environments.

Another problem with this conventional practice is that catalogue only displays rather limited number of combinations regarding the domestic furniture so that the customer may not be able to see his/her desirable combination of furniture. On the part of the seller, he/she may need to keep a huge amount of catalogues so that he/she may best fulfill the demand of various customers. Accordingly, the manufacturers of the furniture may need produce a corresponding number of catalogues for showing different combinations of features or aesthetical design.

The second method of previewing different furniture combinations is that the retailer may prepare a plurality of materials samples which are to be shown to the customers so as to allow the customers to appreciate or imagine, from the relevant materials samples, the whole picture of the combination of the relevant furniture.

Obviously, the problem of this practice is that the customers are really hard to extrapolate from the materials samples to form a whole picture of the combination of the relevant furniture. As a result, many people may experience that when the furniture has been delivered to his/her home, the overall effect of the combination of furniture may be totally different from what he/she has imagined at the time when he/she placed the order. In addition, this practice also requires the retailers to keep a large number of materials samples in an easily retrievable manner. This may not be possible for all furniture retailers.

For builders on the other hand, when a particular housing estate has to be built, the furniture combination for each of the, say, apartments, need to be individually selected. The process can be extremely cumbersome: each of the purchasers of the apartments have to be shown a large number of catalogues and then chooses their favorite combination of furniture. The builders concerned must individually collect every single combination of furniture order and then prepare the required resources for building such diverse combination of furniture for every single apartment. As a result, the process can be very inefficient and ineffective. Should there be some mistakes in the data collection procedures or inconsistencies between what are shown on the catalogues and the actual appearance of the combination of furniture, the builders may then be involved in complicated disputes and this may even give rise to legal actions brought by the individual purchasers.

SUMMARY OF THE PRESENT INVENTION

A main object of the present invention is to provide a customized domestic furniture system and a method thereof which enable a user to preview a domestic design combined by an electronic floor plan and a selected furniture kit in a virtual environment so as to gain an accurate and explicit idea of different combinations of furniture.

Another object of the present invention is to provide a customized domestic furniture system comprising a plurality of furniture kits and a plurality of electronic floor plans which can be freely selected by the user to simulate different furniture combinations in a virtual environment so as to customize the furniture design of the user's own domestic environment.

Another object of the present invention is to provide a customized domestic furniture system and a method thereof, wherein the selected electronic floor plan is capable of accurately simulate a floor plan of the user's own domestic environment, so that when different furniture kits are incorporated into the selected floor plan to form the virtual domestic design, it realistically and visually reflects a corresponding domestic environment of the user's own domestic environment, so as to optimally assist the user to select the most desirable combination of furniture by using the customized domestic furniture system.

Another object of the present invention is to provide a customized domestic furniture system and a method thereof which eliminate the need to utilize furniture catalogues or materials samples during a furniture selection and purchasing process, so as to increase the efficiency thereof, and to minimize the cost of running a furniture retail business.

Another object of the present invention is to provide a customized domestic furniture system and a method thereof, wherein the electronic floor plans and the furniture kits can be freely updated so as to allow the present invention to accord with the most up-to-date furniture design and fashions. In other words, the present invention is adapted to be utilized in a rapidly changing field of furniture and interior design.

Another object of the present invention is to provide a system and method of marketing and mass producing customized domestic furniture, wherein the system and the method enable a purchaser of land (whether a freeholder or a leaseholder) to preview a domestic design combined by an electronic floor plan and a selected furniture kit in a virtual environment so as to gain an accurate and explicit idea of different combinations of furniture, and to provide the relevant builder with accurate and reliable information of furniture order.

Accordingly, in order to accomplish the above objects, the present invention provides a method of marketing and mass producing customized domestic furniture, comprising the steps of:

(a) generating a plurality of custom made virtual domestic environments by different home owners, wherein at least one furniture kit is selected by each the home owner to match with the domestic furniture in a domestic floor plan;

(b) itemizing the furniture kits from the virtual domestic environments, wherein each of the furniture kits contains an itemized code representing to the virtual domestic environment from the respective home owner;

(c) mass-ordering the furniture kits with respect to the itemized code thereof; and (d) delivering each of the furniture kits to the respective home owner in accordance with the virtual domestic environment custom made by the home owner.

Moreover, the present invention provides a system of marketing and mass producing customized domestic furniture, comprising:

a graphic customizing center having an electronic database which contains a plurality of domestic floor plans and a plurality of furniture kits, wherein each of the domestic floor plans, which is simulated from a domestic environment to imitate the domestic furniture therein, has a plurality of customized areas preset on the domestic furniture to be customized for generating a plurality of custom made virtual domestic environments; and a service center itemized the furniture kits selected from the virtual domestic environments to mass-order the furniture kits for reducing a cost of the furniture kit in quantity manner.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1, FIG. 5 to FIG. 7 of the drawings, a system of marketing and producing customized domestic furniture according to a preferred embodiment of the present invention is illustrated, in which the system of marketing and mass producing customized domestic furniture comprises a graphic customizing center 10, and a service center 20.

Figure 1:
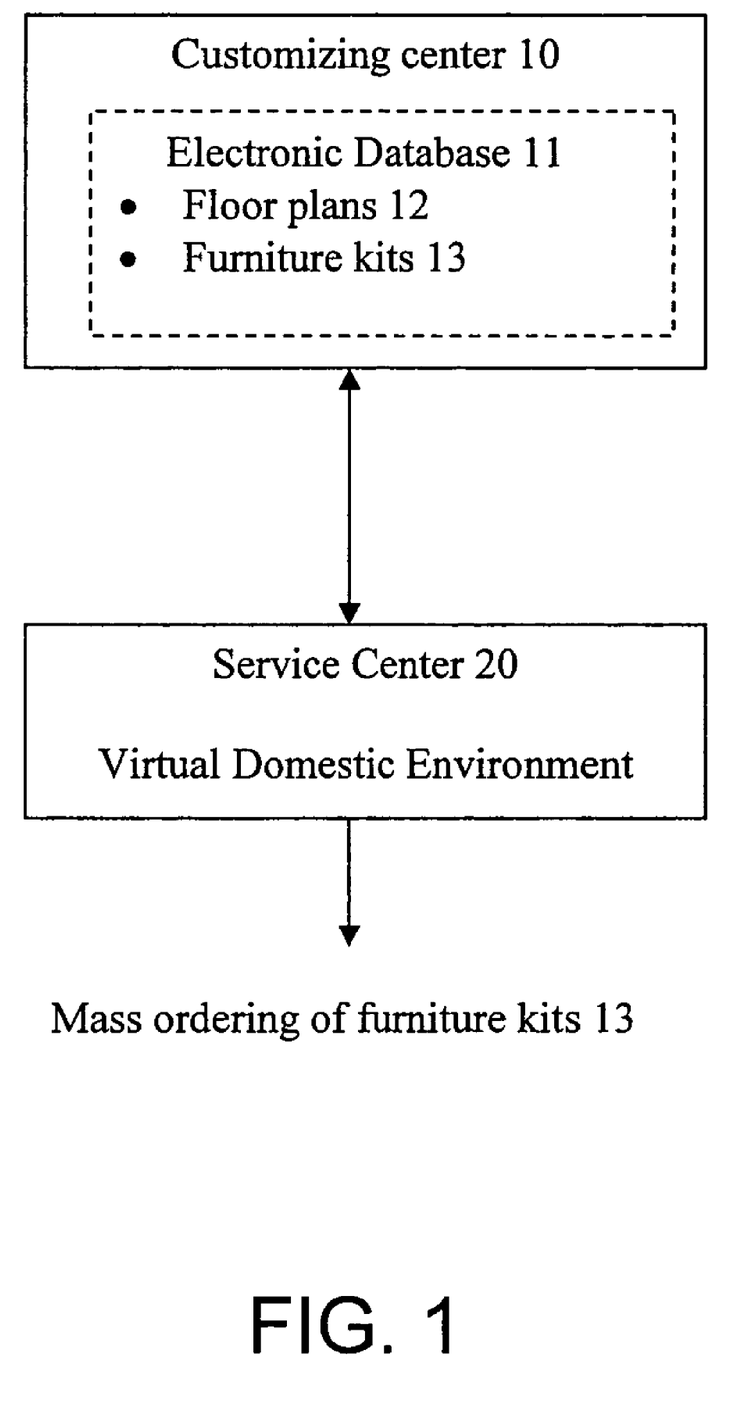
FIG. 1 is a schematic diagram of a system of marketing and mass producing customized domestic furniture according to a preferred embodiment of the present invention.

The graphic customizing center 10 has an electronic database 11 which contains a plurality of domestic floor plans 12 and a plurality of furniture kits 13, wherein each of the domestic floor plans 12, which is simulated from a domestic environment to imitate the domestic furniture therein, has a plurality of customized areas 121 preset on the domestic furniture to be customized for generating a plurality of custom made virtual domestic environments.

The service center 20 itemizes the furniture kits 13 selected from the virtual domestic environments to mass-order the furniture kits 13 for reducing a cost of the furniture kits 13 in quantitative manner.

According to the preferred embodiment of the present invention, the furniture kits 13 selected in the virtual domestic environment is digitally stored in the electronic database 11 and is assigned with an itemized code for the service center 20 to order the furniture kits 13 in a large quantity so as to maximum business efficiency of the builders/furniture dealers utilizing the present invention.

Each of the furniture kits 13 graphically displays a specific texture and color to be customized with respect to the domestic furniture so that the user of the present invention is able to choose a particular furniture kit 13 for customizing the domestic furniture in the virtual domestic environment. As such, the user of the present invention is able to choose his/her favorite combination of furniture kits 13 by customizing specific textures and colors of different furniture kits 13 within the virtual domestic environment.

Figure 2:
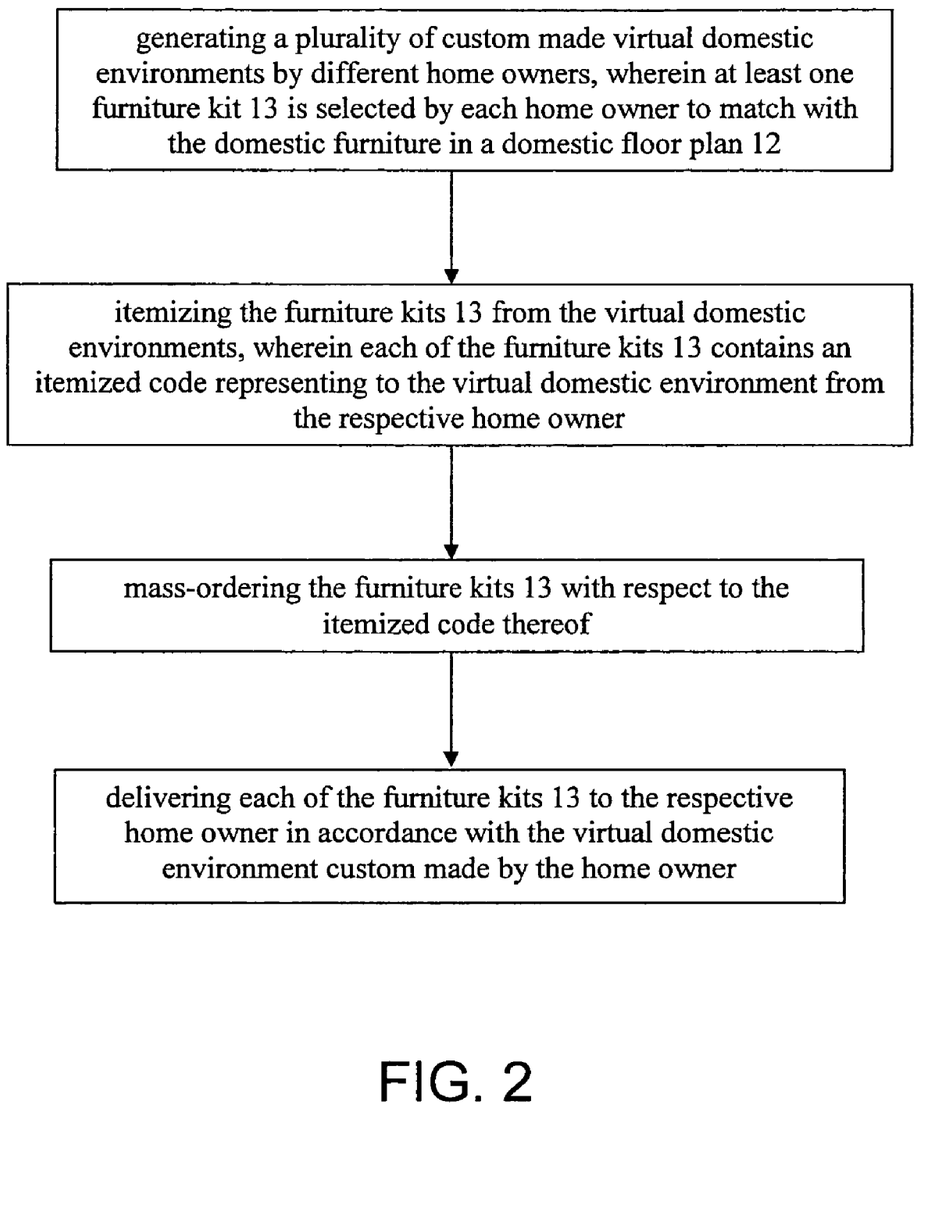
FIG. 2 is a flow diagram of a method of marketing and mass producing customized domestic furniture according to the above preferred embodiment of the present invention.

Referring to FIG. 2 of the drawings, a method of marketing and mass producing customized domestic furniture is illustrated, wherein the method comprises the steps of:

(a) generating a plurality of custom made virtual domestic environments by different home owners, wherein at least one furniture kit 13 is selected by each home owner to match with the domestic furniture in a domestic floor plan 12;

(b) itemizing the furniture kits 13 from the virtual domestic environments, wherein each of the furniture kits 13 contains an itemized code representing to the virtual domestic environment from the respective home owner;

(c) mass-ordering the furniture kits 13 with respect to the itemized code thereof; and (d) delivering each of the furniture kits 13 to the respective home owner in accordance with the virtual domestic environment custom made by the home owner.

Step (a) comprises the steps of:

(a.1) graphically displaying the domestic floor plans 12 simulated from the virtual domestic environments to imitate the domestic furniture therein, wherein each of the domestic floor plans 12 has a plurality of customized areas 121 preset on the domestic furniture to be customized;

(a.2) selecting the furniture kit 13 by the home owner to place on the customized area 121 of the domestic furniture in the domestic floor plan 12 so as to match the domestic furniture to generate the virtual domestic environment in a custom made manner; and (a.3) previewing the domestic floor plan 12 with the selected furniture kit 13 on the domestic furniture to simulate a virtual domestic design of the domestic furniture in the virtual domestic environment for the home owner to confirm.

Moreover, step (b) further comprises a step of assigning the itemized code to each of the furniture kits 13 selected in each of the virtual domestic environments from the respective home owner such that statuses of the furniture kits 13 are adapted to be chased to ensure the furniture kits 13 being ordered correctly and delivered on time.

The method of marketing and mass producing customized domestic further comprises a step after step (c) of mass-producing the furniture kits 13 ordered from the home owners to reduce a manufacturing cost of the furniture kit 13. Accordingly, the virtual domestic environment with the furniture kits 13 selected by the respective home owner is digitally recorded with the itemized codes as a home owner profile to assure the home owner of a corrected order of the furniture kits 13.

Referring to FIG. 3, FIG. 5 to FIG. 7 of the drawings, a customized domestic furniture system for customizing domestic furniture in a virtual domestic environment is illustrated. According to a preferred embodiment of the present invention, the customized domestic furniture system comprises plurality of domestic floor plans 12, a plurality of furniture kits 13, and a virtual simulator 30.

Figure 3:
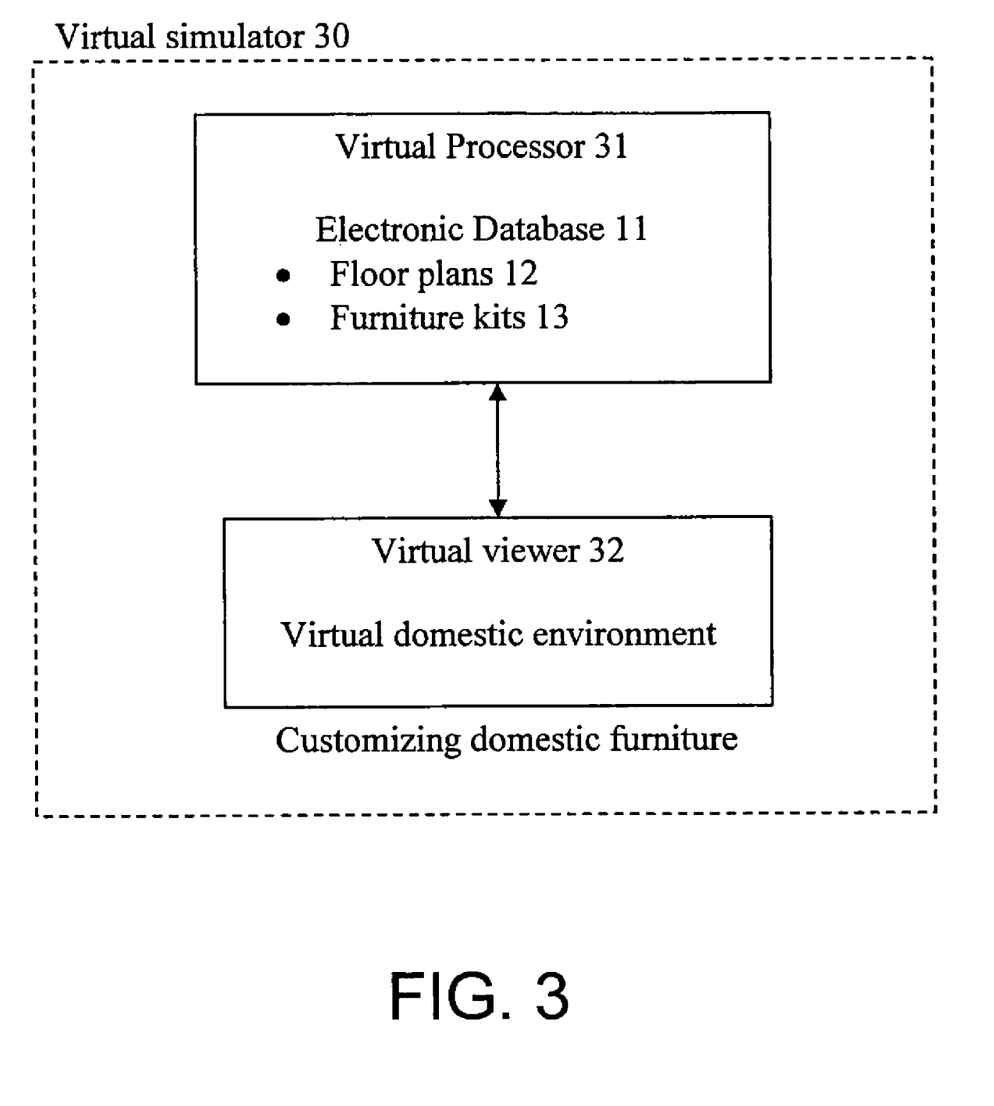
FIG. 3 is a schematic diagram of a customized domestic furniture system according to the above preferred embodiment of the present invention.

The plurality of domestic floor plans 12 each has a plurality of customized areas 121 adapted to be customized, wherein each of the domestic floor plans 12 is an electronic floor plan simulated from the virtual domestic environment which is preferably is generated by utilizing a computer.

The plurality of furniture kits 13 each of which is simulated from the domestic furniture, wherein at least one of the furniture kits 13 is selectively placed on the customized areas 121 of one of the domestic floor plans 12 for matching the domestic furniture in the virtual domestic environment.

The virtual simulator 30 combines the relevant domestic floor plan 12 with the selected furniture kit 13 thereon to convert the domestic floor plan 12 in a viewable form so as to simulate a virtual domestic design in the virtual domestic environment. As such, a user of the present invention is able to visually appreciate the virtual domestic deign in the virtual domestic environment so as to customize the domestic furniture to the most favorable or optimal aesthetic appeal.

Figure 5:
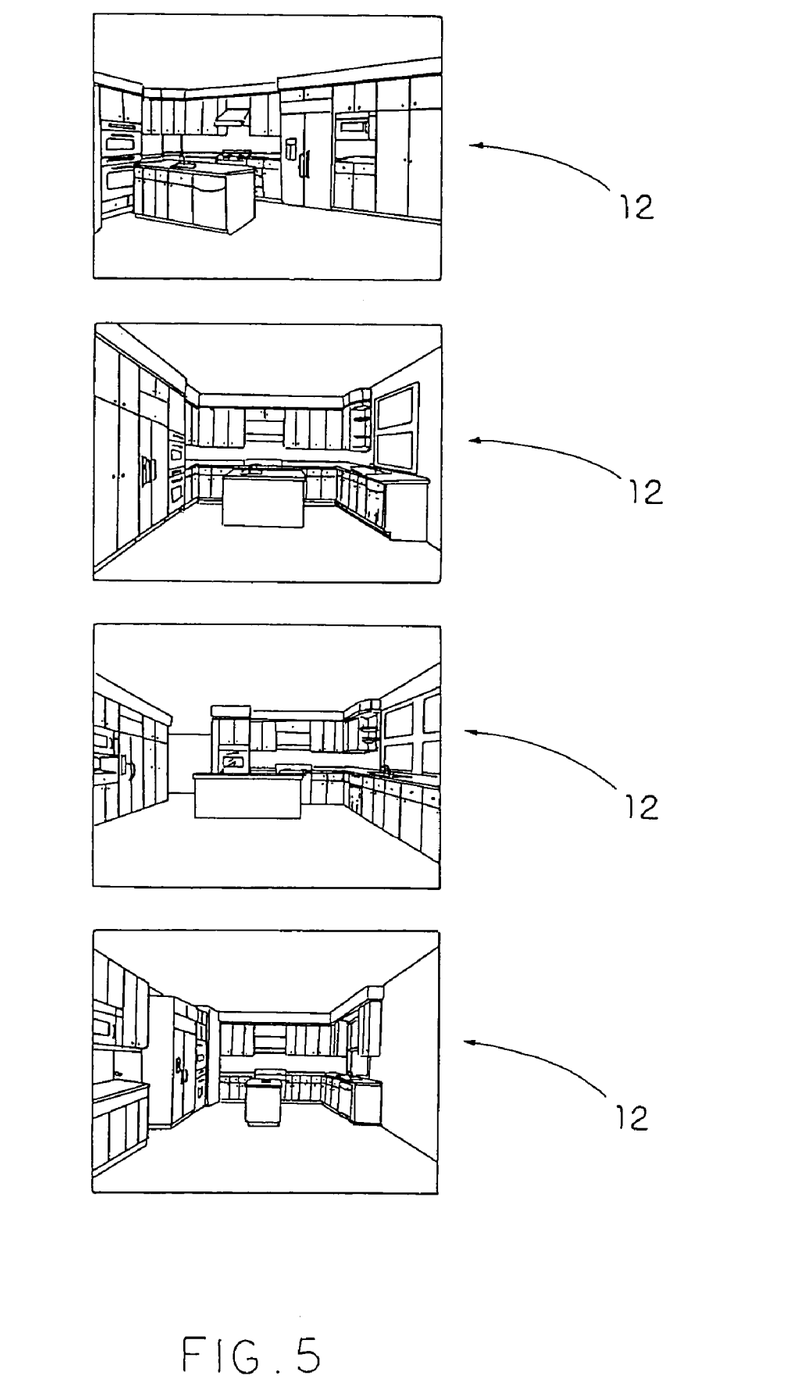
FIG. 5 is a schematic diagram of examples of the floor plans according to the above preferred embodiment of the present invention.
Figure 6:
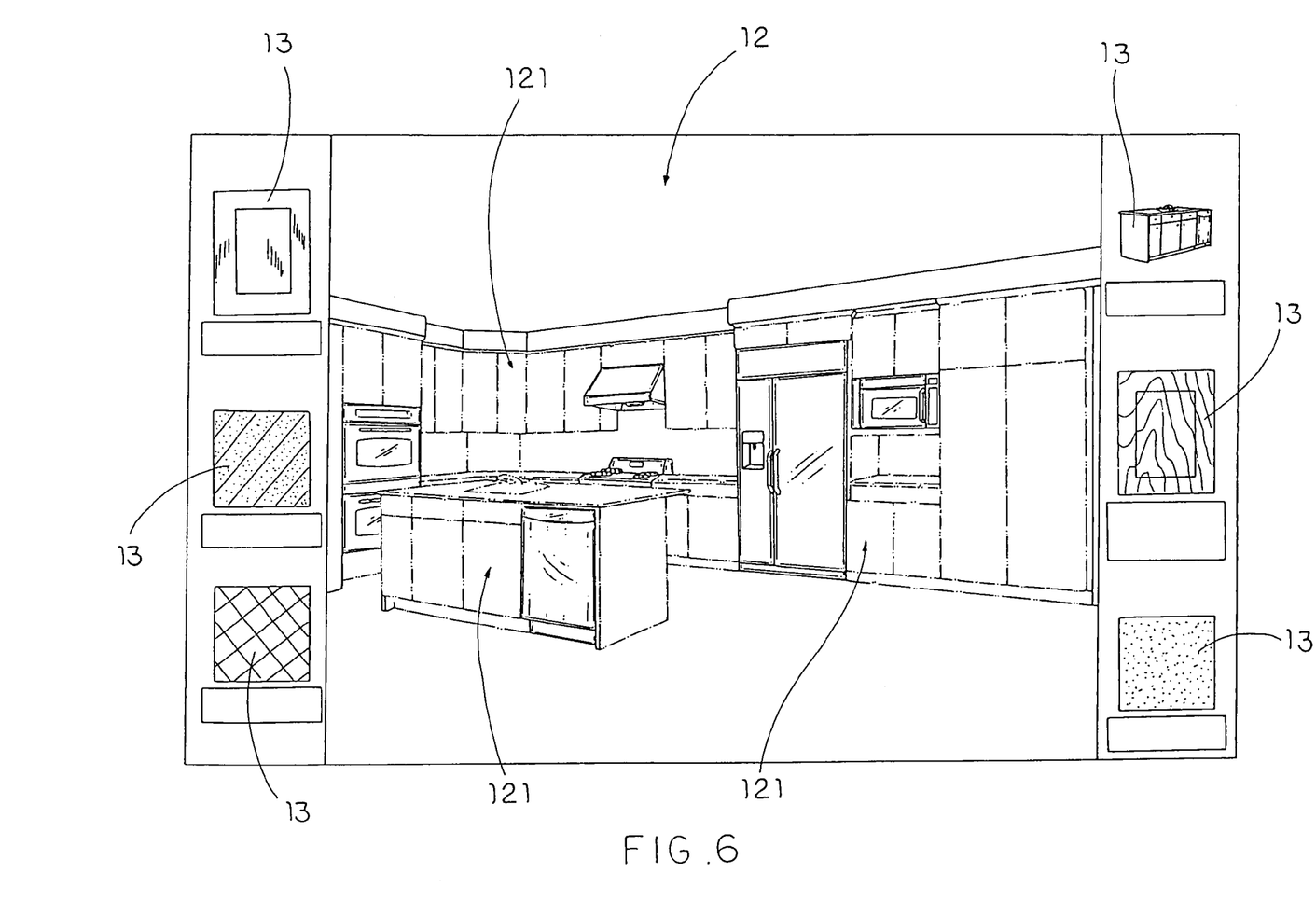
FIG. 6 is a perspective view of the floor plan according to the above preferred embodiment of the present invention, illustrating that no furniture kits are selected.
Figure 7:
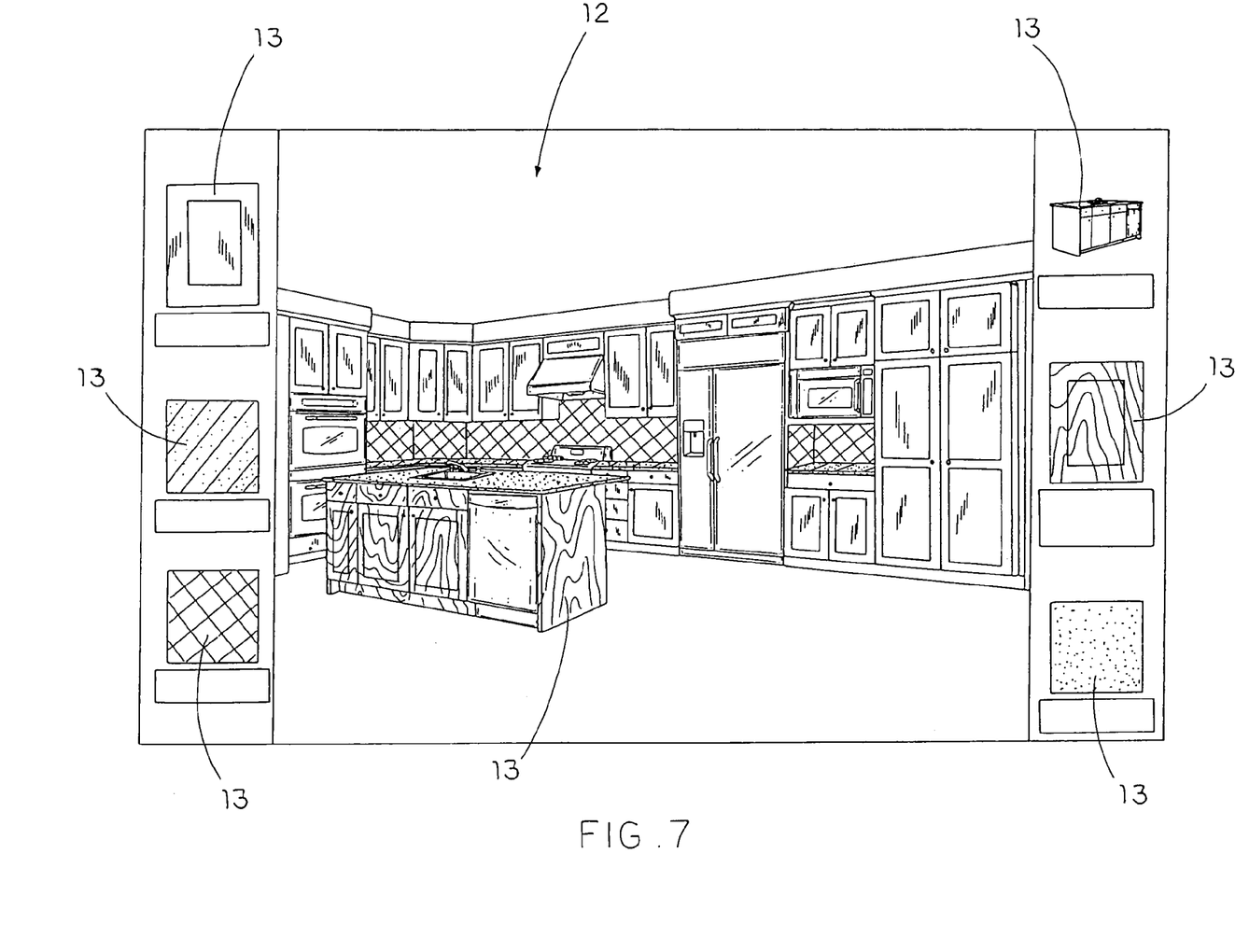
FIG. 7 is a perspective view of the floor plan according to the above preferred embodiment of the present invention, illustrating that a plurality of furniture kits have been selected to customize the domestic furniture.

Each of the domestic floor plans 12 is adapted to simulate a predetermined design of a general domestic environment, such as a kitchen, a bathroom, a living room, or the likes. Accordingly, each of the customized area 121 of the domestic floor plans 12 is virtually created to simulate particular domestic furniture within the corresponding floor plan 12, such as a cupboard, a countertop, floor tiles, or the likes.

Thus, the predetermined numbers of floor plans 12 is pre-created so that a user of the present invention may choose the floor plan 12 which is the most similar to his/her own domestic environment. Alternatively, the user may specifically create a floor plan having the customized area 121 which is corresponding to his/her own domestic environment for optimally customizing the domestic furniture thereof.

Each of the furniture kits 13 are virtually created to match with the corresponding floor plan 12, and comprises a plurality of furniture attributes corresponding with an attribute of the domestic furniture which is to be matched with the relevant customized areas 121 of the corresponding floor plan 12. The furniture attributes are preferably embodied as physical attributes of the domestic furniture, such as color, cabinet finishing, materials, surface roughness etc. According to the preferred embodiment of the present invention, each of the furniture kits 13 graphically displays a specific texture and color to be customized with said domestic furniture.

For example, where a customized area 121 of a floor plan 12 is a countertop in a kitchen, the furniture kits 13 corresponding with this customized area 121 can have a furniture attribute embodied as materials, wherein the material may contain a selection of marble, stones, plastics, etc. As another example, the furniture attribute may be embodied as color, so that this attribute contains a selection of colors such as yellow, red, blue, etc.

The virtual simulator 30 comprises a processor 31, such as a typical 3D graphics processor, adapted to generate the virtual environment, and a virtual viewer 32 electrically connected with the processor to electronically display the virtual domestic design in the virtual environment, wherein the virtual domestic design incorporates selected domestic floor plan 12 and the furniture kits 13 for simulating virtual reality of the user's own floor plan so as to allow the user to select the most suitable or favorable combination of the domestic furniture. Accordingly, the virtual simulator 30 further comprises a selection database 33 which is arranged to store the floor plans 12 and the furniture kits 13 and allow retrieval by the user of the present invention for customizing the domestic furniture design.

According to the preferred embodiment of the present invention, the virtual simulator 30 is embodied as a computer so that the processor 31 is embodied as the CPU of the computer, while the virtual viewer 32 is embodied as the monitor of that computer for displaying the virtual domestic design in the virtual environment. In other words, the present invention is preferably implemented by a computer so as to rapidly and accurately customize the furniture kits 13 with the selected floor plan 12.

It is worth mentioning that the present invention may be provided as a self-containing system installed in the retailers' computer so as to allow their customers to select and customize the virtual domestic design before purchasing furniture. Alternatively, the processor 31 may be provided in a central server linked with a plurality of virtual viewers 32 owned by the retailers respectively so that the retailers can operate the present invention through Internet. As such, individual retailers may subscribe this customized domestic furniture system with a central organizer, such as a manufacturer of furniture.

Figure 4:
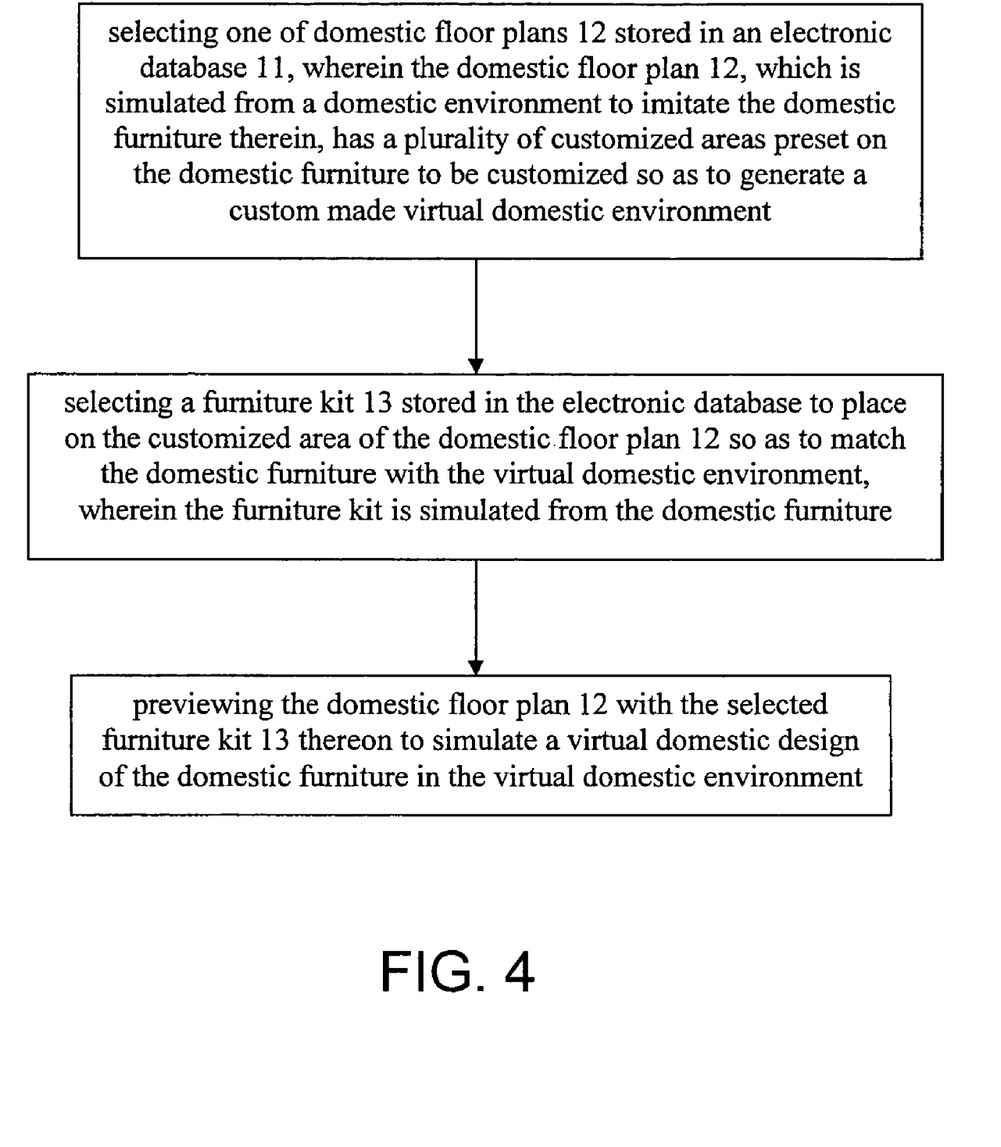
FIG. 4 is a flow diagram of a method of customizing domestic furniture in a virtual domestic environment according to a preferred embodiment of the present invention.

Referring to FIG. 4 of the drawings, a method of customizing domestic furniture in a virtual environment according to a preferred embodiment of the present invention is illustrated, in which the method comprises the steps of:

(a) selecting one of domestic floor plans 12 stored in an electronic database 11, wherein the domestic floor plan 12, which is simulated from a domestic environment to imitate the domestic furniture therein, has a plurality of customized areas 121 preset on the domestic furniture to be customized so as to generate a custom made virtual domestic environment;

(b) selecting a furniture kit 13 stored in the electronic database 11 to place on the customized area 121 of the domestic floor plan 12 so as to match the domestic furniture with the virtual domestic environment, wherein the furniture kit is simulated from the domestic furniture; and (c) previewing the domestic floor plan 12 with the selected furniture kit 13 thereon to simulate a virtual domestic design of the domestic furniture in the virtual domestic environment.

Step (a) through step (c) are preferably performed with the assistant of the above-mentioned virtual viewer 32 so that the user is able to visualize the selection process and preview the virtual domestic design.

The method of customizing domestic furniture further comprises the steps, prior to step (a), of:

(1) providing an electronic database 11;

(2) creating a plurality of floor plans 12 each of which has a plurality of customized areas 121;

(3) creating a plurality of furniture kits 13; and (4) storing the floor plans and the furniture kits in the electronic database 11 for a user to select.

The floor plans 12 are specifically designed to simulate various domestic environments of a typical residential structure. The furniture kits 13 are designed to reflect one of the attributes of the furniture simulated in the corresponding customized areas 121. As a result, the method further comprises a step (5) after step (4) of periodically updating the floor plans 12 and the furniture kits 13 so as to allow the user of the present invention to select the optimal floor plan 12 and the most recent development of furniture design. In other words, when the new design of furniture is developed and supplied for sale, the relevant retailers may be able to update the electronic database 11 to broaden the range of selection for their customers.

In order to customize the virtual domestic design of the domestic furniture, the method of customizing domestic furniture further comprises the steps of:

(d) re-selecting and replacing at least one of the selected furniture kits 13 with the corresponding number of the furniture kits 13 stored in the electronic database 11 when the virtual domestic design does not achieve optimality as considered by the user of the present invention.

In this circumstance, the furniture kits 13 for different customized areas 121 may be re-selected and replaced for the user to customize the virtual domestic design corresponding with his/her own domestic environment. Since the viewer 20 accurately reflects the domestic environment from which the virtual environment simulates, the user is imparted with certainty how the domestic furniture will look like when it is delivered and installed to his/her own domestic environment. This substantially minimizes any guesswork as to the actual aesthetic appeal of the relevant furniture during a conventional furniture transaction.

It is also worth mentioning that the furniture manufacturers and the retailers no longer need to keep a large number of catalogues and materials samples in order to demonstrate the overall aesthetic effect of a combination of furniture features. This substantially reduces the running cost of furniture industry, while allowing the customers to acquire a more accurate, reliable, and flexible appreciation of domestic furniture design from the virtual domestic design generated by the present invention.

For sophisticated application of the present invention, the floor plans 12 are categorized into a plurality of floor plan classes based on one or certain common attributes of each of the floor plans 12. For example, the floor plans may be categorized based on a style of design of each of the floor plans 12. For example, the floor plans 12 may be divided into 'Western style', 'Chinese style', Mediterranean style', so on and so forth. The floor plans 12 belonging to each of these categories may possess particular features, such as the presence of one or more customized area 121.

Likewise, the furniture kits 13 can also be categorized into a plurality of kits groups according to the furniture attributes, or by the customized area 121 on which the relevant furniture kit 13 is attached. These categorizations of the floor plans 12 and the furniture kits 13 are necessary where there exists a large number of floor plans 12 and the furniture kits 13 for the customers to choose.

In other words, the method of customizing domestic furniture in a virtual environment, before step (a), further comprises the steps of:

computer-generating a plurality of fixed areas of the domestic furniture in the virtual environment as the customized areas 121 in each of the floor plans 12 respectively, categorizing the furniture kits 13 into a plurality of kit groups such that each of the kit groups contains at least one the furniture kit 13, wherein each of the kit groups is allowed to be selected in the particular customized area 121 of each of the floor plans 12.

Moreover, the method further comprises a step of systematically categorizing the floor plans 12 into a plurality of floor plan classes, wherein the floor plans 12 in each of the classes has a common attribute for being previewed so as to allow the user to select the floor plans 12 in an organized manner.

From the forgoing descriptions, it can be shown that the above-mentioned objects have been substantially accomplished. The present invention provides a customized domestic furniture system and a method thereof which enable a user to preview a virtual domestic design combined by an electronic floor plan and a selected furniture kit.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A computer-implemented method of marketing and mass producing customized domestic furniture, comprising the steps of:

(a) computer-generating a plurality of custom made virtual domestic environments by different home owners, wherein at least one furniture kit is selected by each said home owner to match with said domestic furniture in a domestic floor plan, wherein the step (a) comprises the steps of:

(a.1) graphically displaying said domestic floor plans simulated from said virtual domestic environments to imitate said domestic furniture therein, wherein each of said domestic floor plans has a plurality of customized areas preset on said domestic furniture to be customized;

(a.2) selecting said furniture kit by said home owner to place on said customized area of said domestic furniture in said domestic floor plan so as to match said domestic furniture to generate said virtual domestic environment in a custom made manner; and (a.3) previewing said domestic floor plan with said selected furniture kit on said domestic furniture to simulate a virtual domestic design of said domestic furniture in said virtual domestic environment for said home owner to confirm;

(b) itemizing said furniture kits from said virtual domestic environments, wherein each of said furniture kits contains an itemized code representing to said virtual domestic environment from said respective home owner;

(c) mass-ordering said furniture kits with respect to said itemized code thereof; and (d) delivering each of said furniture kits to said respective home owner in accordance with said virtual domestic environment custom made by said home owner.

2. A computer-implemented method of marketing and mass producing customized domestic furniture, comprising the steps of:

(a) computer-generating a plurality of custom made virtual domestic environments by different home owners, wherein at least one furniture kit is selected by each said home owner to match with said domestic furniture in a domestic floor plan, wherein the step (a) comprises the steps of:

(a.1) graphically displaying said domestic floor plans simulated from said virtual domestic environments to imitate said domestic furniture therein, wherein each of said domestic floor plans has a plurality of customized areas preset on said domestic furniture to be customized;

(a.2) selecting said furniture kit by said home owner to place on said customized area of said domestic furniture in said domestic floor plan so as to match said domestic furniture to generate said virtual domestic environment in a custom made manner; and (a.3) previewing said domestic floor plan with said selected furniture kit on said domestic furniture to simulate a virtual domestic design of said domestic furniture in said virtual domestic environment for said home owner to confirm;

(b) itemizing said furniture kits from said virtual domestic environments, wherein each of said furniture kits contains an itemized code representing said virtual domestic environment from said respective home owner;

(c) mass-ordering said furniture kits with respect to said itemized code thereof by mass-producing said furniture kits ordered from said home owners to reduce a manufacturing cost of said furniture kit; and (d) delivering each of said furniture kits to said respective home owner in accordance with said virtual domestic environment custom made by said home owner.

3. The method as recited in claim 2, in step (b), further comprising a step of assigning said itemized code to each of said furniture kits selected in each of said virtual domestic environments from said respective home owner such that statuses of said furniture kits are adapted to be chased to ensure said furniture kits being ordered correctly and delivered on time.

4. The method, as recited in claim 3, wherein said virtual domestic environment with said furniture kits selected by said respective home owner is digitally recorded with said itemized codes as a home owner profile to assure said home owner of a corrected order of said furniture kits.

5. The method, as recited in claim 2, wherein said virtual domestic environment with said furniture kits selected by said respective home owner is digitally recorded with said itemized codes as a home owner profile to assure said home owner of a corrected order of said furniture kits.

6. A computer system of marketing and mass producing customized domestic furniture, comprising:

an electronic database which contains a plurality of domestic floor plans and a plurality of furniture kits, wherein each of said domestic floor plans, which is simulated from a domestic environment to imitate said domestic furniture therein, has a plurality of customized areas preset on said domestic furniture to be customized for generating a plurality of custom made virtual domestic environments;

means for customizing each of said furniture kits with said domestic furniture, having said customized areas preset on said domestic furniture; and means for itemizing said furniture kits selected from said virtual domestic environments to mass-order said furniture kits for reducing a cost of said furniture kits in quantity manner.

7. The system, as recited in claim 6, wherein each of said furniture kits selected in said virtual domestic environment is digitally stored in said electronic database and is assigned with an itemized code for said service center mass-ordering said furniture kit.

8. The system, as recited in claim 7, wherein each of said furniture kits graphically displays a specific texture and color to be customized with said domestic furniture.

9. The system, as recited in claim 6, wherein each of said furniture kits graphically displays a specific texture and color to be customized with said domestic furniture.

10. A computer-implemented method of customizing domestic furniture in a virtual domestic environment, comprising the steps of:

(a) selecting one of domestic floor plans stored in an electronic database, wherein said domestic floor plan, which is simulated by a processor of a virtual simulator from a domestic environment to imitate said domestic furniture therein, has a plurality of customized areas preset on said domestic furniture to be customized so as to generate a custom made virtual domestic environment;

(b) selecting a furniture kit stored in said electronic database to place on said customized area of said domestic furniture in said domestic floor plan so as to match said domestic furniture with said virtual domestic environment; and (c) previewing said domestic floor plan with said selected furniture kit on said domestic furniture through a virtual viewer of said virtual simulator to simulate a virtual domestic design of said domestic furniture in said virtual domestic environment.

11. The method as recited in claim 10, before the step (a), further comprising the steps of:

computer-generating a plurality of fixed areas of said domestic furniture in said virtual environment as said customized areas in each of said floor plans respectively, categorizing said furniture kits into a plurality of kit groups such that each of said kit groups contains at least one said furniture kit, wherein each of said kit groups is allowed to be selected in said particular customized area of each of said floor plans.

12. The method, as recited in claim 11, wherein each of said furniture kits graphically displays a specific texture and color to be customized with said domestic furniture.

13. The method, as recited in claim 12, further comprising a step of systematically categorizing said floor plans into a plurality of floor plan classes, wherein said floor plans in each of said classes has a common attribute for being previewed so as to allow said user to select said floor plans in an organized manner.

14. The method, as recited in claim 13, further comprising a step of periodically updating said floor plans and said furniture kits to incorporate a most recent development of said domestic furniture.

15. The method, as recited in claim 11, further comprising a step of systematically categorizing said floor plans into a plurality of floor plan classes, wherein said floor plans in each of said classes has a common attribute for being previewed so as to allow said user to select said floor plans in an organized manner.

16. The method, as recited in claim 11, further comprising a step of periodically updating said floor plans and said furniture kits to incorporate a most recent development of said domestic furniture.

17. The method, as recited in claim 10, wherein each of said furniture kits graphically displays a specific texture and color to be customized with said domestic furniture.

* * * * *